United States Patent
Rosenberg (10) Patent No.: US 8,223,754 B2
(45) Date of Patent: *Jul. 17, 2012

(54) AUTO-CONFIGURED VOICE OVER INTERNET PROTOCOL

(75) Inventor: Jonathan David Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 12/367,930

(22) Filed: Feb. 9, 2009

(65) Prior Publication Data

US 2010/0202438 A1    Aug. 12, 2010

(51) Int. Cl.
*H04L 12/28* (2006.01)

(52) U.S. Cl. ......... 370/353; 370/354; 370/400; 370/401

(58) Field of Classification Search .......... 370/351–354, 370/356, 386, 389, 392, 395.31, 395.52, 370/400, 401, 402, 494

See application file for complete search history.

(56) References Cited

U.S. PATENT DOCUMENTS

| | | | |
|---|---|---|---|
| 5,590,370 A | 12/1996 | Asthana et al. | 395/800 |
| 5,699,514 A | 12/1997 | Durinovic-Johri et al. | 395/188.01 |
| 6,012,144 A * | 1/2000 | Pickett | 726/26 |
| 6,088,683 A * | 7/2000 | Jalili | 705/26.8 |
| 6,295,575 B1 | 9/2001 | Blumenau et al. | 711/5 |
| 6,404,870 B1 | 6/2002 | Kia et al. | 379/144.01 |
| 6,529,501 B1 | 3/2003 | Zhao et al. | 370/353 |
| 6,674,850 B2 | 1/2004 | Vu et al. | 379/220.01 |
| 6,700,964 B2 * | 3/2004 | Schmid et al. | 379/189 |
| 6,950,652 B2 | 9/2005 | Janssen et al. | 455/419 |
| 6,961,334 B1 * | 11/2005 | Kaczmarczyk | 370/354 |
| 7,016,343 B1 | 3/2006 | Mermel et al. | 370/356 |
| 7,143,052 B2 | 11/2006 | LaSalle et al. | 705/7 |
| 7,188,138 B1 | 3/2007 | Schneider | 709/203 |
| 7,190,772 B2 * | 3/2007 | Moisey et al. | 379/114.27 |
| 7,218,722 B1 * | 5/2007 | Turner et al. | 379/221.02 |
| 7,266,114 B2 | 9/2007 | Furukawa et al. | 370/352 |
| 7,289,493 B1 | 10/2007 | Vera | 370/356 |
| 7,352,856 B2 | 4/2008 | Matsuhashi et al. | 379/387.02 |

(Continued)

FOREIGN PATENT DOCUMENTS

EP    1 009 153 A1    6/2000

(Continued)

OTHER PUBLICATIONS

Seedorf, Jan; SIP Security: Status Quo and Future Issues; Dec. 27, 2006; 23rd Chaos Communication Congress; pp. 1-5.*

(Continued)

*Primary Examiner* — Robert Scheibel
*Assistant Examiner* — Mark A Mais
(74) *Attorney, Agent, or Firm* — Brinks Hofer Gilson & Lione (57) ABSTRACT

In one embodiment, an apparatus may receive a call over a Public Switched Telephone Network (PSTN) from a Voice over Internet Protocol (VoIP) adapter. The VoIP adapter may be one or more devices that may create and accept VoIP connections over a network, such as the Internet, and that may transmit a call over the PSTN. The apparatus may store a call detail of the received call in a registry service, where the call detail is associated with a node identifier of the apparatus in the registry service. The apparatus may further determine a dial sequence at which the apparatus may be reached over the PSTN based on corresponding call details also stored in the registry service.

20 Claims, 2 Drawing Sheets

U.S. PATENT DOCUMENTS

| | | | |
|---|---|---|---|
| 7,383,572 B2 * | 6/2008 | Rolfe | 726/5 |
| 7,394,803 B1 * | 7/2008 | Petit-Huguenin et al. | 370/352 |
| 7,457,283 B2 * | 11/2008 | Dalton et al. | 370/352 |
| 7,729,700 B2 * | 6/2010 | Alemany et al. | 455/436 |
| 7,822,188 B1 | 10/2010 | Kirchhoff et al. | 379/211.02 |
| 7,852,831 B2 * | 12/2010 | Akbar | 370/352 |
| 7,855,982 B2 * | 12/2010 | Ramankutty et al. | 370/259 |
| 7,983,243 B2 * | 7/2011 | Casey et al. | 370/352 |
| 8,040,875 B2 * | 10/2011 | Barclay et al. | 370/352 |
| 2002/0004900 A1 | 1/2002 | Patel | 713/155 |
| 2003/0053605 A1 * | 3/2003 | Cashiola | 379/88.17 |
| 2003/0055898 A1 | 3/2003 | Yeager et al. | 709/205 |
| 2004/0067761 A1 | 4/2004 | Pyhalammi et al. | 455/466 |
| 2005/0232428 A1 * | 10/2005 | Little et al. | 380/277 |
| 2006/0182029 A1 * | 8/2006 | Kealy et al. | 370/230 |
| 2006/0216131 A1 | 9/2006 | Jhuang | 411/181 |
| 2006/0294576 A1 * | 12/2006 | Cross et al. | 726/1 |
| 2007/0183440 A1 | 8/2007 | Bennet et al. | 370/419 |
| 2007/0201660 A1 | 8/2007 | Lan et al. | 379/201.01 |
| 2007/0248098 A1 | 10/2007 | Chen | 370/395.2 |
| 2008/0052270 A1 | 2/2008 | Karlsson | 707/3 |
| 2008/0292077 A1 | 11/2008 | Vinokurov et al. | 379/142.04 |
| 2009/0022149 A1 | 1/2009 | Rosenberg et al. | 370/389 |
| 2009/0022150 A1 | 1/2009 | Rosenberg et al. | 370/389 |
| 2009/0022155 A1 | 1/2009 | Rosenberg et al. | 370/392 |
| 2009/0025075 A1 | 1/2009 | Chow et al. | 726/10 |
| 2009/0100262 A1 | 4/2009 | Yoo | 713/155 |
| 2009/0323677 A1 | 12/2009 | Mehmood et al. | 370/352 |
| 2010/0002686 A1 | 1/2010 | Rosenberg et al. | 370/352 |
| 2010/0002687 A1 | 1/2010 | Rosenberg et al. | 370/352 |
| 2010/0046507 A1 | 2/2010 | Rosenberg et al. | 370/352 |
| 2010/0082828 A1 | 4/2010 | Jennings et al. | 709/229 |
| 2010/0157853 A1 | 6/2010 | Li et al. | 370/271 |

FOREIGN PATENT DOCUMENTS

| | | |
|---|---|---|
| EP | 1 385 323 A1 | 1/2004 |
| EP | 1 555 786 A1 | 7/2005 |
| EP | 1 855 104 A1 | 2/2008 |
| JP | 2004-040541 | 2/2004 |
| JP | 2004-304281 | 10/2004 |
| WO | WO 2009/014974 A1 | 1/2009 |

OTHER PUBLICATIONS

Seedorf, Jan; Using Cryptographically Generated SIP-URIs to protect the integrity of content in P2P-SIP; Third Annual VoIP Security Workshop; Jun. 2, 2006.*
Niccolini, Saverio; SPIT Prevention: state of the art and research challenges; Third Annual VoIP Security Workshop; Jun. 2, 2006.*
Materna, Bogden; Threat Mitigation for VoIP; Third Annual VoIP Security Workshop; Jun. 2, 2006.*
Hansen et al.; Developing a Legally Compliant Reachability management system as a Countermeasure against SPIT; Third Annual VoIP Security Workshop; Jun. 2, 2006.*
Jennings et al.; Verification Involving PSTN Reachability: Requirements and Architecture Overview; Apr. 1, 2011; Internet Engineering Task Force; Version 00; pp. 1-41.*
Marias et al.; SIP Vulnerabilities and Anti-SPIT Mechanisms Assessment; Aug. 16, 2007; IEEE Computer Communications and Networks, 2007. Proceedings of 16th International Conference on Computer Communications and Networks (ICCCN), 2007; pp. 597-604.*
Office Action dated Oct. 6, 2010, pp. 1-11, U.S. Appl. No. 12/370,384, U.S. Patent and Trademark Office, Virginia.
Freedman, M., Morris, R., Tarzan: A Peer-to-Peer Anonymizing Network Layer, dated 2002, pp. 1-14, ACM, Washington, D.C.
Tor: Overview, dated Mar. 2, 2009, pp. 1-5, The Tor Project, Inc., available at www.torproject.org.
Wang, X., Chen, S., Jajodia, S., Tracking Anonymous Peer-to-Peer VoIP Calls on the Internet, dated 2005, pp. 1-11, ACM, Alexandria, Virginia.
Ramasubramanian, V., Sirer, E., Perils of Transitive Trust in the Domain Name System, dated May 13, 2005, pp. 1-6, Cornell University, available at http://ecommons.library.cornell.edu.
Walsh, K., Sirer, E., Experience with an Object Reputation System for Peer-to-Peer Filesharing, dated 2006, pp. 1-14, USENIX Association.
Notice of Allowance, dated Sep. 14, 2010, pp. 1-6, U.S. Appl. No. 11/780,975, U.S. Patent and Trademark Office, Virginia.
U.S. Appl. No. 12/370,384, filed Feb. 12, 2009, Rosenberg et al.
U.S. Appl. No. 12/495,615, filed Jun. 30, 2009, Mehmood et al.
U.S. Appl. No. 12/495,639, filed Jun. 30, 2009, Rosenberg et al.
U.S. Appl. No. 12/495,595, filed Jun. 30, 2009, Jennings et al.
Wu, T., The SRP Authentication and Key Exchange System, dated Sep. 2000, pp. 1-11, The Internet Society.
Rosenberg, J., Jennings, C., The Session Initiation Protocol (SIP) and Spam, dated Jan. 2008, pp. 1-37, The IETF Trust.
Falstrom, P., "E 164 number and DNA", Request for Comments No. 2916, Network Working Group, Sep. 2000, p. 1-9, Cisco Systems, Inc.
International Search Report dated Dec. 12, 2008, pp. 1-5, International Application No. PCT/US2008/070259, European Patent Office, The Netherlands.
Written Opinion dated Dec. 12, 2008, pp. 1-6, Application No. PCT/US2008/070259, European Patent Office, Germany.
Call detail record, dated May 5, 2009, pp. 1-2, Wikipedia, http://en.wikipedia.org/wiki/Call_detail_record.
Computer telephony integration, dated May 12, 2009, pp. 1-4, Wikipedia, http://en.wikipedia.org/wiki/Computer_telephony_integration.
Provisioning Protocol-Specific Interfaces, dated 2007, pp. 1-2, available at www.cisco.com, Cisco.
Neuman, C., Hartman, S., Raeburn, K., RFC 4120, dated Jul. 2005, pp. 1-139, The Internet Society.
Understanding DNSBL Filtering, Spamhaus, dated Oct. 25, 2007, pp. 1-3, www.spamhaus.org.
Bryan, D., Matthews, P., Shim, E., Willis, D., Concepts and Terminology for Peer to Peer SIP, dated Jun. 2007, pp. 1-26, IETF.
Office Action, dated May 20, 2010, pp. 1-14, U.S. Appl. No. 11/780,975, U.S. Patent and Trademark Office, Virginia.
International Search Report dated Apr. 5, 2010, pp. 1-3, International Application No. PCT/US2010/022004, European Patent Office, The Netherlands.
Written Opinion dated Apr. 5, 2010, pp. 1-7, Application No. PCT/US2010/022004, European Patent Office, Germany.
Office Action, dated Jan. 12, 2011, pp. 1-44, U.S. Appl. No. 12/495,615, U.S. Patent and Trademark Office, Virginia.
Office Action, dated Jan. 7, 2011, pp. 1-43, U.S. Appl. No. 12/495,595, U.S. Patent and Trademark Office, Virginia.
Office Action, dated Jan. 6, 2011, pp. 1-49, U.S. Appl. No. 11/780,928, U.S. Patent and Trademark Office, Virginia.
Office Action, dated Jan. 6, 2011, pp. 1-43, U.S. Appl. No. 11/780,941, U.S. Patent and Trademark Office, Virgina.
Office Action, dated Jan. 13, 2011, pp. 1-53, U.S. Appl. No. 12/495,639, U.S. Patent and Trademark Office, Virginia.
Office Action, dated Jan. 20, 2011, pp. 1-56, U.S. Appl. No. 12/608,484, U.S. Patent and Trademark Office, Virginia.
Office Action, dated Feb. 4, 2011, pp. 1-71, U.S. Appl. No. 12/608,545, U.S. Patent and Trademark Office, Virginia.
Office Action, dated Mar. 8, 2011, pp. 1-34, U.S. Appl. No. 12/370,384, U.S. Patent and Trademark Office, Virginia.
International Search Report, dated Nov. 4, 2010, pp. 1-3, International Application No. PCT/US2010/037459, European Patent Office, The Netherlands.
Written Opinion, dated Nov. 4, 2010, pp. 1-8, International Application No. PCT/US2010/037459, European Patent Office, The Netherlands.
Rosenberg, J. et al., RFC 5039—The Session Initiation Protocol (SIP) and Spam, dated Jan. 2008, pp. 1-27, www.rfc-editor.org/rfc/rfc5039.txt.
Rosenberg, J. et al., The Session Initiation Protocol (SIP) and Spam—draft-rosenberg-sipping-spam-00, dated Jul. 11, 2004, pp. 1-21, IETF, http://tools.ietf.org/html/draft-rosenberg-sipping-spam-00.
Cao, Feng et al., Providing Response Identity and Authentication in IP Telphony, dated 2006, pp. 1-8, IEEE Computer Society.
International Preliminary Report on Patentability, dated Jan. 26, 2010, pp. 1-7, International Application No. PCT/US2008/070259, International Bureau of WIPO, Switzerland.

Lack of Unity Action and Partial International Search, dated Mar. 3, 2011, pp. 1-6. International Application No. PCT/US2010/051820, European Patent Office, The Netherlands.

d'Heureuse, Nico et al., Protecting SIP-based Networks and Services from Unwanted Communications, dated 2008, pp. 1-5, IEEE.

Chiang, Hsia-Ling et al., A Study of Global Numbering Plan With Active Anti-Spit Capability on Voip, dated 2008, pp. 17-22, IEEE.

Office Action, dated Nov. 1, 2011, pp. 1-41, U.S. Appl. No. 11/780,928, U.S. Patent and Trademark Office, Virginia.

Office Action, dated Nov. 3, 2011, pp. 1-41, U.S. Appl. No. 11/780,941, U.S. Patent and Trademark Office, Virginia.

European Office Action, dated Nov. 14, 2011, pp. 1-4, European Patent Application No. 08781931.4, European Patent Office, Germany.

Notice of Allowance, dated Jul. 28, 2011, pp. 1-9, U.S. Appl. No. 11/780,975, U.S. Patent and Trademark Office, Virginia.

Notice of Allowance, dated Oct. 5, 2011, pp. 1-8, U.S. Appl. No. 12/370,384, U.S. Patent and Trademark Office, Virginia.

International Search Report, dated Mar. 18, 2011, International Application No. PCT/US2010/051822, European Patent Office, The Netherlands.

Office Action, dated Jun. 22, 2011, pp. 1-31, U.S. Appl. No. 11/780,941, U.S. Patent and Trademark Office, Virginia.

Office Action, dated Jun. 22, 2011, pp. 1-40, U.S. Appl. No. 11/780,928, U.S. Patent and Trademark Office, Virginia.

Office Action, dated Jun. 24, 2011, pp. 1-34, U.S. Appl. No. 12/608,545, U.S. Patent and Trademark Office, Virginia.

Office Action, dated Jun. 27, 2011, pp. 1-36, U.S. Appl. No. 12/495,615, U.S. Patent and Trademark Office, Virginia.

Office Action, dated Jun. 27, 2011, pp. 1-40, U.S. Appl. No. 12/495,639, U.S. Patent and Trademark Office, Virginia.

Office Action, dated Jun. 27, 2011, pp. 1-41, U.S. Appl. No. 12/608,484, U.S. Patent and Trademark Office, Virginia.

Office Action, dated Jun. 27, 2011, pp. 1-35, U.S. Appl. No. 12/495,595, U.S. Patent and Trademark Office, Virginia.

International Search Report, dated Jun. 29, 2011, International Application No. PCT/US2010/051820, European Patent Office, The Netherlands.

Notice of Allowance, dated Aug. 18, 2011, pp. 1-10, U.S. Appl. No. 12/370,384, U.S. Patent and Trademark Office, Virginia.

International Preliminary Report on Patentability, dated Aug. 9, 2011, pp. 1-7, International Application No. PCT/US2010/022004, International Bureau of WIPO, Switzerland.

Notice of Allowance, dated Apr. 7, 2011, pp. 1-17, U.S. Appl. No. 11/780,975, U.S. Patent and Trademark Office, Virginia.

Notice of Allowance, dated Feb. 16, 2011, pp. 1-11, U.S. Appl. No. 11/780,928, U.S. Patent and Trademark Office, Virginia.

Notice of Allowance, dated Feb. 22, 2012, pp. 1-11, U.S. Appl. No. 11/780,941, U.S. Patent and Trademark Office, Virginia.

Office Action, dated Jan. 23, 2012, pp. 1-41, U.S. Appl. No. 12/608,484, U.S. Patent and Trademark Office, Virginia.

Office Action, dated Jan. 23, 2012, pp. 1-41, U.S. Appl. No. 12/608,545, U.S. Patent and Trademark Office, Virginia.

Office Action, dated Jan. 23, 2012, pp. 1-39, U.S. Appl. No. 12/495,639, U.S. Patent and Trademark Office, Virginia.

Office Action, dated Jan. 25, 2012, pp. 1-48, U.S. Appl. No. 12/495,595, U.S. Patent and Trademark Office, Virginia.

Office Action, dated Jan. 26, 2012. pp. 1-51, U.S. Appl. No. 12/495,615, U.S. Patent and Trademark Office, Virginia.

International Preliminary Report on Patentability and Written Opinion, dated Jan. 12, 2012, pp. 1-8, International Application No. PCT/US2010/037459, International Bureau of WIPO, Switzerland.

* cited by examiner

Figure 1

Figure 2

AUTO-CONFIGURED VOICE OVER INTERNET PROTOCOL

TECHNICAL FIELD

The present disclosure relates generally to Voice over Internet Protocol (VoIP).

BACKGROUND

Consumers may obtain VoIP services by using the services of a service provider. The consumers have to sign-up for the services. For example, Vonage®, a registered trademark of Vonage Marketing, Inc., a Delaware Corporation based in New Jersey, has a consumer sign-up and receive a piece of hardware in order to connect to use VoIP. VoIP may also be provided to consumers on personal computers through PC-based VoIP providers. An example of such a provider is SKYPE®, a registered trademark of Skype Limited Corporation of Ireland. These PC-based VoIP providers also have consumers sign-up in order to use VoIP.

Furthermore, VoIP services either have the consumer obtain a new phone number for receiving VoIP calls or have the consumer assign an existing number to the VoIP service provider. Typically the consumer also has to sign a service contract. For PC-based VoIP, consumers also have to configure their personal computers in order to use VoIP. Non-technical consumers may have difficulty with such configurations.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DESCRIPTION OF EXAMPLE EMBODIMENTS

Overview

By way of introduction, the example embodiments described below include an apparatus, logic encoded in a computer readable media, and a method to auto-configure VoIP connectivity.

According to a first aspect, an apparatus is provided to receive a call over a Public Switched Telephone Network (PSTN) from a Voice over Internet Protocol (VoIP) adapter. The apparatus may store a call detail of the call in a registry service, where the call detail is associated in the registry service with a node identifier of the apparatus. The registry service may be accessible to the apparatus and to the VoIP adapter over a network. The apparatus may also determine a dial sequence at which the apparatus may be reached over the PSTN based on a dial sequence that includes digits to initiate the call, where the call detail matches a corresponding call detail of the call also stored in the registry service.

In a second aspect, logic may be encoded in computer readable media, where the logic, when executed by a processor, may receive at a Voice over Internet Protocol (VoIP) adapter calls over a Public Switched Telephone Network (PSTN). Furthermore, the encoded logic, when executed, may determine at the VoIP adapter at least one dial sequence at which the VoIP adapter is reachable over the PSTN based on hashed call details. The hashed call details are generated from a cryptographic hash function applied to corresponding call details related to the calls. Each one of the hashed call details may be written to a registry service.

In a third aspect, a method is provided. Call details may be stored in a registry service, where the call details are of calls initiated over a Public Switched Telephone Network (PSTN). A Voice over Internet Protocol (VoIP) adapter may determine a dial sequence based on at least one of the call details in the registry service, where the VoIP adapter is reachable at the dial sequence over the PSTN. The VoIP adapter may be advertised as reachable over VoIP at the dial sequence.

Example Embodiments

In one example, home routers may be sold as a consumer product. Each of the routers may include an Ethernet jack that is used to connect the router to an Internet service provider, such as an 8 Position 8 Contact (8P8C) female jack. Each of the routers may also include two phone jacks, such as RJ-11 jacks (Registered Jacks). One of the RJ-11 jacks may be used to connect the respective one of the routers to an existing phone line in a home. The phone line may be in communication with the Public Switched Telephone Network (PSTN). The other one of the RJ-11 jacks may be used to connect the respective one of the routers to an analog phone. In different examples, the consumer product may be packaged in alternative forms.

Two consumers, Consumer A and Consumer B, each using one of these routers, may call each other using VoIP without configuring anything. As is explained later, each of the routers may determine the phone number assigned to the phone line that is connected to the respective one of the routers based on start and stop times of calls received on the PSTN and based on the digits dialed to make the calls. Using the start and stop times of one or more calls transmitted on the PSTN, each of the routers may additionally determine a VoIP address of the other one of the routers.

For example, Consumer A may connect one of the routers to the Internet, to the existing phone line in the home of Consumer A, and to the analog phone of Consumer A. Consumer B may connect the other one of the routers to the Internet, to the existing phone line in the home of Consumer B, and to an analog phone of Consumer B. When Consumer A dials the number of Consumer B for the first one or more times, the router may transmit the call over the PSTN. Thereafter, when Consumer A dials the number of Consumer B, the router may transmit the call over VoIP. Neither Consumer A nor Consumer B has to configure a router. The consumers do not have to sign up with a VoIP service provider. The phone numbers do not have to be reassigned to a new carrier. In alternative embodiments, only one Consumer has this example router, but the other consumer has a the consumer product packaged in a different form.

Figure 1:
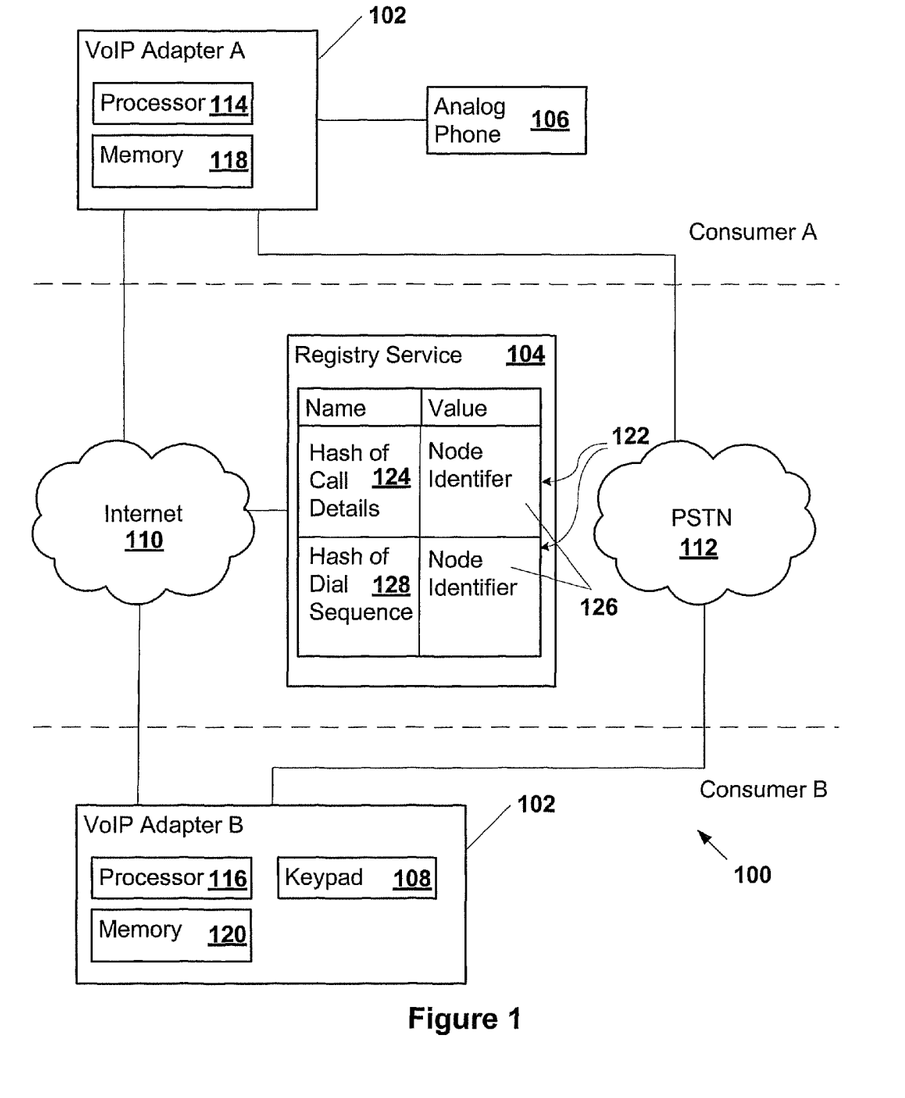
FIG. 1 illustrates one example of a system to provide auto-configured VoIP connectivity.

FIG. 1 illustrates one example of a system 100 to provide auto-configured VoIP connectivity. The system 100 may include two or more VoIP adapters 102, individually designated VoIP Adapter A and VoIP Adapter B in FIG. 1. Additionally, the system 100 may include a registry service 104. In one example, the system 100 may also include one or more analog phones 106. The system 100 may include more, less, or different components.

Each one of the VoIP adapters 102 may be one or more devices that may initiate and/or accept a VoIP connection over a network, such as the Internet 110, and may transmit and/or accept a call over the Public Switched Telephone Network (PSTN) 112. The VoIP connection may be a connection based on a VoIP protocol, such as Session Initiation Protocol (SIP), H.323, GoogleTalk or any other suitable protocol to transmit and receive audio signals over the network. The network may be the Internet 110, a Local Area Network (LAN), a Wireless Local Area Network (WLAN), a Personal Area Network (PAN), a Wide Area Network (WAN), or any other now known or later developed communications network other than the PSTN 112. The PSTN 112 is a public circuit-switched telephone network. The PSTN 112 includes cellular networks for mobile phones and/or wired-lines for fixed telephones. Any one of the VoIP adapters 102 may be hereafter referred to as a VoIP adapter.

Examples of the VoIP adapter may include a router, a telephone, a handset, a cell phone, a computer, a laptop, a Personal Digital Assistant (PDA), a server, and the Cisco® Unified Communications Manager from Cisco Technologies, Inc. of San Jose, Calif. In one example, the VoIP adapter may be packaged as a home router. In a different example, the VoIP adapter may be packaged as a handset that communicates with a telephone base station over a first wireless connection and communicates with a wireless router over a second wireless connection. The telephone base station may be in communication with the PSTN 112. The wireless router may be in connection with the Internet 110.

In one example, the VoIP adapter may be in communication with the analog phone 106. The analog phone 106 may be any phone designed to operate on a Plain Old Telephone Service (POTS) line that is in communication with the PSTN 112. A user may dial any digit sequence by selectively pressing buttons on the analog phone 106. Alternatively or in addition, the VoIP adapter may include a keypad 108. The user may dial any digit sequence by selectively pressing buttons included on the keypad 108. In another example, any device to accept user input and generate a digit sequence from the user input, now known or later discovered, may be in communication with the VoIP adapter.

Each of the VoIP adapters 102 may include a processor 114 and 116 and a memory 118 and 120. The memory 114 and 116 may be any now known or later discovered data storage device. The memory 118 and 120 may include a non-volatile and/or volatile memory, such as a random access memory (RAM), a read-only memory (ROM), an erasable programmable read-only memory (EPROM), or flash memory. The memory 118 and 120 may include an optical, magnetic (hard-drive) or any other form of data storage device. The processor 114 and 116 may be in communication with the memory 118 and 120. The processor 114 and 116 may also be in communication with additional components, such as the analog phone 106 and the keypad 108. The processor 114 and 116 may be a general processor, central processing unit, server, application specific integrated circuit (ASIC), digital signal processor, field programmable gate array (FPGA), digital circuit, analog circuit, or combinations thereof. The processor 114 and 116 may be one or more devices operable to execute computer executable instructions. The computer executable instructions may be included in computer code.

The computer code may be included in the memory 118 and 120. The computer code may include logic embedded in the computer executable instructions. The computer code may be written in any computer language now known or later discovered, such as C++, C#, Java, Pascal, Visual Basic, Perl, HyperText Markup Language (HTML), JavaScript, assembly language, and any combination thereof.

The VoIP adapter may include a certificate unique among the VoIP adapters 102. The certificate may be a public key certificate. The VoIP adapter may also include a public key and a private key.

The registry service 104 may be any service that stores and retrieves key-value pairs that the VoIP adapters 102 may access over the network. For example, the registry service 104 may be maintained as a peer-to-peer network. The peer-to-peer network may utilize diverse connectivity between participants, or nodes, in a network and the cumulative bandwidth of network participants rather than conventional centralized resources where a relatively low number of servers provide the service to an application. The peer-to-peer network may be implemented on all or a subset of the VoIP adapters 102. For example, the registry service 104 may include distributed hash tables (DHT) coordinated using any suitable peer-to-peer protocol, such as Chord, Controller Area Network (CAN), Bamboo, or Kademlia. In such an example, the registry service 104 may be a distributed service maintained and provided by the VoIP adapters 102. In a second example, the registry service 104 may be a centralized database as illustrated in FIG. 1. The database may include a memory with any electronic collection of information stored therein. The information may be organized so that the information may be accessed, managed, and updated. Examples of a database include but are not limited to a Relational Database Management System (RDBMS), an object-oriented database, an extensible markup language (XML) database, a file system, memory structures, or other now known or later developed data organization and storage mechanism. Each of the key-value pairs 122 includes a key and an associated value. Given the key, the registry service 104 may look up the associated value. The registry service 104 may permit the VoIP adapter to add one of the key-value pairs 122 and/or delete one of the key-value pairs 122. In one example, the registry service 104 may also permit the VoIP adapter to update the value associated with the key. In another example, the registry service 104 may associate additional values with the key, such as a timestamp.

In one example, the registry service 104 may include a registry of VoIP call routing information. In a different example, the registry service 104 may be a registry that is distinct and different from the registry of VoIP call routing information.

During operation, the VoIP adapter may join the peer-to-peer network as a node in the example where the registry service 104 is maintained in the peer-to-peer network. The node may be any device or combination of devices that is included in the peer-to-peer network and that is treated as a single participant of the peer-to-peer network. In one example, the VoIP adapter may include hard-coded identifiers of bootstrap nodes in the peer-to-peer network. The VoIP adapter may join the peer-to-peer network when, for example, when the VoIP adapter is first powered up.

In one example, the VoIP adapter may connect to a Network Time Protocol (NTP) server (not shown) to obtain a synchronized time. For example, the VoIP adapter may connect to the NTP when the VoIP adapter is first powered up.

When the VoIP adapter is first powered up, the VoIP adapter may not yet know the phone number or phone numbers at which the VoIP adapter may be reached over the PSTN 112. When the VoIP adapter receives a call over the PSTN 112, the VoIP adapter may permit the call to be answered, for example, with the analog phone 106. The VoIP adapter may store call details in the memory 118 and 120.

The call details may include any information that relates to the call or is received during the call. For example, the call details may include a start time of the call, an end time of the call, caller ID information, or any combination thereof. The end time of the call may be the time at which the call completes. For example, the call may complete when the user terminates the call by hanging up.

After the call completes, the VoIP adapter may generate a hash of the call details 124 by applying a cryptographic hash function to the call details. The cryptographic hash function may be any transformation that takes an input message and returns a hash value, where the transformation has the following characteristics: (1) the hash value may be efficiently calculated for any given input message; (2) the input message may be computationally expensive to determine from the hash value; and (3) two distinct input messages are unlikely to have the same hash value regardless of the similarity between the two input messages. The hash value may be of a fixed size. The hash value may be known as a message digest, a digital fingerprint, or a digest. Examples of the cryptographic hash function include Message-Digest algorithm 5 (MD5) and Secure Hash Algorithm 1 (SHA-1).

For example, the VoIP adapter may generate the hash of the call details 124 from a concatenation of the start time of the call and the end time of the call. In one example, the VoIP adapter may round and/or truncate the start time and end time to a predetermined precision, such as 5 seconds, before concatenating the two times.

The VoIP adapter may store the hash of the call details 124 and a node identifier 126 of the VoIP adapter in the registry service 104 as the key and the value respectively of the key-value pair 122. The node identifier 126 may be any identifier that may identify the VoIP adapter from among the other VoIP adapters 102. For example the node identifier 126 may be the certificate, a Globally Unique Identifier (GUID), or a network address of the VoIP adapter on the network, such as an Internet Protocol (IP)v4 or IPv6 address. Alternatively, the node identifier 126 may not include the network address. For example, if the registry service 104 is maintained in a peer-to-peer network, the node identifier 126 may be an identifier of the node corresponding to the VoIP adapter in the peer-to-peer network. In one example, the VoIP adapter may store the hash of the call details 124 and the node identifier 126 of the VoIP adapter in the registry service 104 for every call that the VoIP adapter receives over the PSTN 112. In alternative examples, the VoIP adapter may store the hash of the call details 124 for a limited number of the calls that the VoIP adapter receives over the PSTN 112.

In one example, the node identifier 126 and a value that includes the network address may be stored in the registry service 104 as a key-value pair. For example, the value may be a VoIP address of the VoIP adapter. The VoIP address may be any identifier that may be used to initiate the VoIP connection to a device or combination of devices identifiable with the identifier. For example, the VoIP address may include a network address, such as an IP address. The VoIP address may also include protocol specific information such as "sip:", "http:", and "https:". Consequently, if the VoIP adapter is to connect to another VoIP adapter, the VoIP adapter may send a message through the peer-to-peer network requesting a connection. At that moment, the network address and/or the VoIP address may be obtained and used just for that connection. Consequently, the network address of the VoIP adapter may be obtained using Dynamic Host Configuration Protocol (DHCP).

Methods of communicating with a device connected through a router that performs network address translation (NAT) are known. For example, Interactive Connectivity Establishment (ICE) provides a protocol for Network Address Translator (NAT) traversal. Consequently, the VoIP adapter may be connected to a router that performs network address translation.

Whenever the user attempts to initiate a call, the VoIP adapter may selectively transmit the call either over the PSTN 112 or over the network using VoIP. For example, when a user first dials a series of digits in a dial sequence, the VoIP adapter may transmit the call over the PSTN 112. The VoIP adapter may store the call details of the call and the dial sequence in the memory 118 and 120. For example, the VoIP adapter may store the dial sequence "5065000" and the start time and end time of the corresponding call.

The dial sequence may be the digits entered by a user to complete initiation of the call. Thus, the dial sequence may not be in an E.164 format. The E.164 format is an ITU Telecommunication Standardization Sector (ITU-T) recommendation that includes the format of telephone numbers used in the PSTN 112. For example, the dial sequence may be "9025000" when dialing a local phone number, where the corresponding E.164 formatted phone number may be "+14089025000". Thus, the dial sequence may be one of many possible dial sequences at which a phone line may be reachable over the PSTN 112; the dial sequence often varies based on the locale of the caller.

In one example, the VoIP adapter may determine whether the phone line is in communication with another one of the VoIP adapters 102 after the VoIP adapter has first initiated a determined number of calls over the PSTN 112 to the dial sequence. To do so, the VoIP adapter may generate hashes of the corresponding call details for each respective one of the calls. The VoIP adapter may look up the values associated with each respective one of the hashes of the call details 124 in the registry service 104. If each of the values includes the node identifier 126, then the node identifier 126 identifies one of the VoIP adapters 102 that is in communication with the phone line that is reachable over the PSTN 112 at the dial sequence. Alternatively, if the values contains the network address of the VoIP adapter, or any other suitable identifier for the VoIP adapter, the values may be compared with other values or keys in the registry service 104 to determine the VoIP adapter 102 that is reachable over the PSTN 112 at the dial sequence.

The determined number of calls may be one, two, three, or any other number of calls. The greater the number of calls, the greater amount of difficulty an attacker would have to generate hashes of the call details 124 that match the hashes of the call details 124 generated by the VoIP adapter initiating the determined number of calls. Given the random nature of call start times and call end times, a high degree of randomness may be introduced even where the number of calls equals two.

Nevertheless, the odds that any two phones in the world would start and stop a call at the same time may be high. However, the odds that any two phones would start and stop two calls at the same times over a period of a week, for example, is much lower. The odds that any two phones would start and stop three calls at the same times over a period of a week, for example, is extremely low. In one example, the determined number of calls may be a function of the number of VoIP adapters 102 on the network.

When the VoIP adapter looks up the values associated with each respective one of the hashes of the call details 124 in the registry service 104, the VoIP adapter may round time-based information before creating the hashes of the call details 124. Time-based information may include, for the example, the start times or end times. If the VoIP adapter fails to find a match, the VoIP adapter may repeat the look up, but vary the time values for each repetition in order to account for differences in local clock times.

After the VoIP adapter determines that another one of the VoIP adapters 102 is reachable at the dial sequence, the VoIP adapter may advertise the dial sequence as a phone number at which the other one of the VoIP adapters 102 is reachable. To do so, the VoIP adapter may store the hash of the dial sequence 128 and the node identifier 126 of the other one of the VoIP adapters 102 as a key-value pair 122 in the registry service 104. The VoIP adapter may generate the hash of the dial sequence 128 by applying the cryptographic hash function to the dial sequence 128.

Alternatively or additionally, if the node identifier 126 is found that identifies one of the VoIP adapters 102 that is reachable over the PSTN 112 at the dial sequence, the VoIP adapter 102 may transmit the dial sequence, the corresponding call details, or any combination thereof to the VoIP adapter identified by the node identifier 126. For example, if VoIP Adapter A initiated the calls over the PSTN 112 to VoIP Adapter B, then the node identifier 126 may identify VoIP Adapter B. Given the node identifier 126, VoIP Adapter A may use the registry service 104 to establish a connection to VoIP adapter B. The reason is the registry service 104 may store the network address of VoIP adapter B, or if the registry service is maintained in a peer-to-peer network, the peer-to-peer network may provide protocol messages for establishing connections with a particular node. Once VoIP adapter A connects to VoIP adapter B, VoIP Adapter A may transmit the dial sequence to VoIP Adapter B using the network address and any method now known or later discovered for communicating data across the network. For example, VoIP Adapter A may issue a Hypertext Transfer Protocol over Secure Socket Layer (HTTPS) request to VoIP Adapter B, where the HTTPS request includes the dial sequence. In a different example, VoIP Adapter A may transmit the dial sequence over a connection established using Transport Layer Security (TLS). TLS may rely on the certificates included in the VoIP adapters 102 to certify the node identifier 126 of each corresponding one of the VoIP adapters 102.

When one of the VoIP adapters 102 receives the dial sequence from another one of the VoIP adapters 102 or the registry service 104, the VoIP adapter may advertise the dial sequence as a phone number at which the VoIP adapter is reachable. In one example, the VoIP adapter may first verify that the call details received from the other one of the VoIP adapters 102 match corresponding call details stored in the memory 118 or 120 or stored in the registry service 104. To advertise the dial sequence as one of the phone numbers at which the VoIP adapter is reachable, the VoIP adapter may store the hash of the dial sequence 128 and the node identifier 126 of the VoIP adapter as a key-value pair 122 in the registry service 104.

As noted earlier, whenever the user attempts to initiate a call, the VoIP adapter may selectively transmit the call either over the PSTN 112 or over the network using VoIP. The VoIP adapter may transmit the call over the network using VoIP if the VoIP adapter has the node identifier 126 of the other one of the VoIP adapters 102 that is reachable over the PSTN 112 at the dial sequence. The VoIP adapter may have the node identifier 126, for example, when the predetermined number of calls over the PSTN 112 has been reached and the VoIP adapter has determined the corresponding node identifier 126. Additionally or alternatively, the VoIP adapter may obtain the node identifier 126 by generating the hash of the dial sequence 128 and looking up the associated node identifier 126 in the registry service 104. Such a lookup may be successful if another one of the VoIP adapters 102 already stored the hash of the dial sequence 128 in the registry service 104.

In one example, the VoIP adapter may verify that the node identifier 126 stored in the registry service 104 actually does identify the VoIP adapter that is reachable at the dial sequence. For example, when the user dials the dial sequence, the VoIP adapter may transmit a first call over the PSTN 112 and request the VoIP adapter identified by the node identifier 126 to provide proof of knowledge of the first call. For example, the proof of knowledge may be the call details of the first call. Upon receipt of the proof of knowledge, the VoIP adapter may make subsequent calls over the network using VoIP. Therefore, after one of the VoIP adapters 102 initiates the determined number of calls over the PSTN 112 for a given dial sequence, each of the other VoIP adapters 102 attempting to reach the same dial sequence may initiate merely the number of calls to verify that the node identifier 126 stored in the registry service 104 actually does identify the VoIP adapter that is reachable at the dial sequence.

One dial sequence may reach a different one of the VoIP adapters 102 depending on the geographic location of the VoIP adapter initiating the call over the PSTN 112. For example, "9025000" when called from a region in China may reach one of the VoIP adapters 102, which is located in China. However, "9025000" when dialed from San Jose, Calif. may reach a different one of the VoIP adapters 102, which is located in California. In such a case, both of the VoIP adapters 102 may legitimately advertise the dial sequence "9025000". However, only the correct one of the VoIP adapters will be able to provide proof of knowledge of the call when the VoIP adapter verifies whether the node identifier 126 stored in the registry service 104 actually does identify the VoIP adapter that is reachable at the dial sequence over the PSTN 112.

The registry service 104 may handle duplicates. For example, if more than one of the VoIP adapters 102 advertises availability at the same dial sequence 128, the node identifiers of each of these VoIP adapters 102 may be stored in the value associated with the hash of the dial sequence 128. Similarly, if more than one of the VoIP adapters 102 store the hash of the call details 124 in the registry service 104 and the hash of the call details 124 is the same, then the node identifiers of each of these VoIP adapters 102 may be stored in the value associated with the hash of the call details 124.

In one example, the registry service 104 may remove any key-value pair 122 that is older than a determined age. For example, the determined age may be a fixed value such as six months.

The VoIP adapter may be lost or stolen. Additionally or alternatively, the VoIP adapter may be temporarily in communication with a phone line for which the possessor of the VoIP adapter lacks authority to use. For example, an attacker may enter a home and plug in one of the VoIP adapters 102 to the phone line in the home. After calling the phone number, the VoIP adapter may start accepting VoIP calls in response users attempting to call the home. If the attacker removes the VoIP adapter and plugs the VoIP adapter in a different location, the VoIP adapter may still accept VoIP calls in response to users attempting to call the home.

To prevent such issues, the VoIP adapter may remove any advertised dial sequences from the registry service 104 in response to a break in communication between the VoIP adapter and the PSTN 112. A device is said to be in communication with another device if electrical signals may be transmitted between the two devices using one or more electrical, optical, wireless or any other type of connection now known or later discovered that is capable of transmitting a signal. A break in the communication may occur when the electrical signals may not be transmitted between the two devices for a predetermined period of time. For example, the VoIP adapter may monitor power on a power line provided by the PSTN 112. The VoIP adapter may store the dial sequences advertised for the VoIP adapter in a non-volatile portion of the memory 118 or 120. In response to a loss of the power on the power line, the VoIP adapter may update the registry service 104 to remove the node identifier 126 of the VoIP adapter from the value that is associated with any hash of the dial sequence 128, where the dial sequence is included in the advertised dial sequences. The power on the power line may power a power monitoring circuit (not shown) included in the VoIP adapter. Additionally or alternatively, the VoIP adapter may remove any advertised dial sequences from the registry service 104 when the VoIP adapter first receives power.

In one example, the power monitoring circuit may include the processor 114 or 116 and the memory 118 or 120. In another example, the power monitoring circuit may include part of the processor 114 or 116 and the memory 118 or 120. For example, the monitoring circuit may include a volatile memory included in the memory 118 or 120, where the volatile memory is powered by the power line provided by the PSTN 112. The processor 114 or 116 may store a predetermined value in the volatile memory when power is first provided to processor 114 or 116 and the volatile memory. If the power to the volatile memory is lost, then the volatile memory may lose the predetermined value stored therein. Thereafter, if the processor 114 or 116 detects that the predetermined value is no longer stored in the volatile memory, then the processor 114 or 116 has detected the loss of power on the power line. In yet another example, the power monitoring circuit may include a separate processor and a separate memory, the separate processor in communication with the separate memory.

In a different example, when a wireless connection between the VoIP adapter and the PSTN 112 is lost, the VoIP adapter may remove any advertised dial sequences from the registry service 104. In still another example, when power to the VoIP adapter is lost, the VoIP adapter may remove any advertised dial sequences from the registry service 104. For example, where the VoIP adapter is a wireless handset, the VoIP adapter should remain charged and in communication, for example, with a base station coupled to the PSTN 112.

Figure 2:
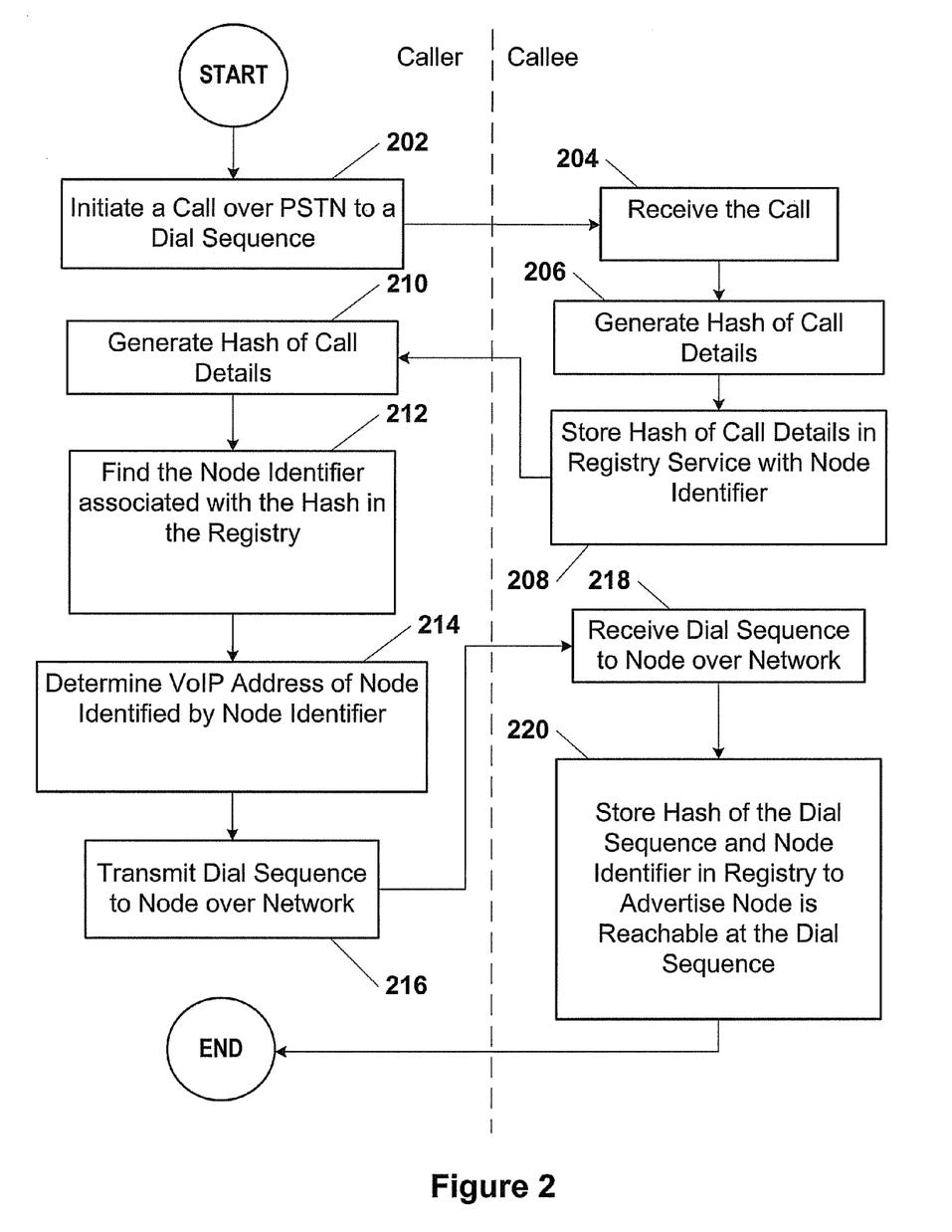
FIG. 2 illustrates one embodiment of a method to auto-configure VoIP connectivity.

FIG. 2 illustrates one embodiment of a method to auto-configure VoIP connectivity. Additional, different, or fewer acts may be performed. The acts may be performed in a different order than illustrated in FIG. 2.

In act 202 of the embodiment illustrated in FIG. 2, the operation may begin by initiating a call to a dial sequence over the PSTN 112. In one example, a caller may have entered the dial sequence on a keypad. The operation may continue in act 204 by receiving the call at the VoIP adapter of a callee. The operation may proceed in act 206 by generating the hash of the call details 124 from the call details that were stored in the VoIP adapter of the callee. The operation continues in act 208 by storing the hash of the call details 124 in the registry service 104 along with the node identifier of the VoIP adapter of the callee.

Later, when a new call to the dial sequence is to be made, the operation may continue in act 210 by generating the hash of the call details 124 from the call details stored in the node of the caller that initiated the original call over the PSTN 112. In act 212, the operation may include finding the node identifier 126 associated with the hash of the call details 124 in the registry service 104. In one example, when the node identifier 126 is found, the operation may continue in act 214 by determining the VoIP address of the VoIP adapter identified by the node identifier. The operation may continue in act 216 by transmitting the dial sequence to the VoIP adapter of the callee.

In act 218, the operation may continue by receiving the dial sequence over the network at the VoIP adapter of the callee. In act 220, the operation may store the hash of the dial sequence 128 and the node identifier 126 in the registry service 104 in order to advertise that the VoIP adapter is reachable over the PSTN 112 at the dial sequence. In some examples, the operation may continue by removing any advertised dial sequence of the VoIP adapter of the callee in response to loss of power on the power line provided by the PSTN, where the power line is coupled to the VoIP adapter of the callee.

The system 100 to provide auto-configured VoIP connectivity described above may have many advantages. For example, the system 100 may be provided without any incurring regular VoIP service fees. Hardware setup may be trivial. The user may not be forced to install any software. The user may not be forced to configure the VoIP adapter. The user may not be forced to assign the phone number to a different service provider. The user may not be forced to get a new phone number. The user may not be forced to sign a new service contract. Existing dialing habits or phones may be reused in the system 100.

The system 100 may also have a network effect. The more VoIP adapters 102 that are added to the system 100, the more value the system 100 may have to the users of the system 100.

Much of the current demand for telephone services provided over the PSTN 112 may be shifted to demand for the VoIP adapters 102 and for related hardware and software. The cost of networking bandwidth to handle VoIP traffic is relatively inexpensive compared with telephone services provided over the PSTN 112. Given the current size of the demand for telephone services, the system 100 has a huge potential market.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. An apparatus comprising:
   a memory; and
   a processor in communication with the memory, the memory including computer code executable with the processor, wherein the computer code is executable to:
   receive a call over a Public Switched Telephone Network (PSTN) at the apparatus, the call initiated from a Voice over Internet Protocol (VoIP) adapter;
   store a node identifier of the apparatus and a call detail of the call in a registry service in response to receipt of the call over the PSTN, wherein the call detail of the call includes proof of knowledge of the call initiated over the PSTN, the call detail of the call is associated in the registry service with the node identifier of the apparatus, and wherein the registry service is accessible by a plurality of VoIP adapters over a network for storage and retrieval of values by the VoIP adapters, the VoIP adapters including the VoIP adapter that initiated the call over the PSTN;
   determine, at the apparatus, a dial sequence at which the apparatus was reached in the call over the PSTN based on a match of the call detail of the call stored in the registry service with a corresponding call detail generated at the VoIP adapter, wherein the dial sequence includes digits dialed to initiate the call; and
   advertise that the apparatus is reachable over VoIP at the dial sequence in response to the determination of the dial sequence at which the apparatus was reached over the PSTN.

2. The apparatus of claim 1, further comprising an Ethernet jack, a first phone jack, and a second phone jack, wherein the processor is in communication with the Ethernet jack, the first phone jack, and the second phone jack, wherein the Ethernet jack is configured to connect to a network, wherein the first phone jack is configured to connect to the PSTN, and wherein the second phone jack is configured to connect to an analog phone.

3. The apparatus of claim 1, wherein the registry service includes a peer-to-peer network maintained on a plurality of VoIP adapters, the VoIP adapters including the apparatus.

4. The apparatus of claim 1, wherein the call detail of the call is stored in the registry service as a hash and the hash is generated from a cryptographic hash function.

5. The apparatus of claim 1, wherein the computer code is further executable to initiate a VoIP connection in response to detection of digits dialed on an analog phone, the analog phone in communication with the processor.

6. The apparatus of claim 1, further comprising a keypad, wherein the processor is in communication with the keypad and wherein the computer code is further executable to determine whether to initiate a VoIP connection over the Internet or a second call over the PSTN in response to a detection of digits selected on the keypad.

7. The apparatus of claim 1, wherein the computer code is further executable to remove the dial sequence from the registry service in response to a break in communication between the apparatus and the PSTN, wherein the dial sequence stored in the registry service indicates the apparatus is reachable over the PSTN at the dial sequence.

8. Logic encoded in one or more tangible non-transitory media for execution with a processor and when executed operable to:
   receive, at a Voice over Internet Protocol (VoIP) adapter, a plurality of calls over a Public Switched Telephone Network (PSTN);
   generate a plurality of hashed call details of the calls at the VoIP adapter, each one of the hashed call details generated from a cryptographic hash function applied to a corresponding one of a plurality of call details, and each one of the call details includes proof of knowledge of a respective one of the calls received over the PSTN;
   determine, at the VoIP adapter, at least one dial sequence at which the VoIP adapter is reached in the calls over the PSTN based on a search of a registry service for a match of the hashed call details of the calls received over the PSTN with corresponding hashed call details of calls that are stored in the registry service, wherein the registry service is accessible by a plurality of VoIP adapters over a network for storage and retrieval of values by the VoIP adapters including the VoIP adapter that received the calls over the PSTN; and
   advertise in the registry service that the VoIP adapter is reachable over VoIP at the at least one dial sequence in response to the determination of the at least one dial sequence at which the VoIP adapter is reached in the calls over the PSTN.

9. The tangible media of claim 8, wherein the encoded logic when executed is further operable to write each one of the hashed call details and a node identifier of the VoIP adapter to the registry service as a corresponding one of a plurality of key-value pairs, wherein each one of the hashed call details is a key in the corresponding one of the key-value pairs.

10. The tangible media of claim 8, wherein the VoIP adapter is a first VoIP adapter and the encoded logic when executed is further operable to receive the at least one dial sequence from a second VoIP adapter over a network, wherein the calls were initiated over the PSTN from the second VoIP adapter.

11. The tangible media of claim 8, wherein the VoIP adapter is a first VoIP adapter and the encoded logic when executed is further operable to:
   initiate a call to a dial sequence over the PSTN;
   determine a node identifier of a second VoIP adapter based on a hash of call details of the call, wherein the second VoIP adapter is reachable over the PSTN at the dial sequence, and the hash of the call details is generated from the cryptographic hash function applied to the call details of the call; and
   transmit the dial sequence to the second VoIP adapter.

12. The tangible media of claim 8, wherein each one of the call details includes at least one of a start time of the respective one of the calls and an end time of the respective one of the calls.

13. The tangible media of claim 11, wherein the encoded logic when executed is further operable to:
   round time-based information included in the call details of the call prior to generation of the hash of the call details of the call;
   find the node identifier associated with the hash of the call details of the call in the registry service; and repeat a search for the node identifier in the registry service until the node identifier is found, wherein for each repetition of the search, the hash of the call details of the call is generated from the cryptographic hash function applied to a plurality of alternate rounded values of the time-based information.

14. A method comprising:
storing in a registry service a plurality of call details of a plurality of calls received over a Public Switched Telephone Network (PSTN) at a first Voice over Internet Protocol (VoIP) adapter, wherein the registry service is accessible by a plurality of VoIP adapters over a network for storage and retrieval of values by the VoIP adapters, the VoIP adapters including the first VoIP adapter that received the calls over the PSTN, each one of the call details comprises proof of knowledge of a respective one of the calls received over the PSTN;
determining, by the first VoIP adapter, a dial sequence at which the first VoIP adapter was reached in the calls received over the PSTN based on a match of at least one of the call details stored in the registry service with at least one call detail of calls generated by a second VoIP adapter, wherein the dial sequence includes digits dialed to initiate the calls over the PSTN, and the at least one call detail of the calls generated by the second VoIP adapter comprises proof of knowledge of at least one of the calls received at the first VoIP adapter; and
advertising the first VoIP adapter as reachable over VoIP at the dial sequence in response to the determination of the dial sequence at which the first VoIP adapter was reached in the calls over the PSTN.

15. The method of claim 14, wherein determining the dial sequence includes receiving, at the first VoIP adapter, the dial sequence from the second VoIP adapter in response to a determination by the second VoIP adapter that the at least one of the call details stored in the registry service matches the at least one call detail of the calls generated by the second VoIP adapter.

16. The method of claim 14, wherein advertising the first VoIP adapter as reachable over VoIP at the dial sequence further comprises storing a hash of the dial sequence and a node identifier of the first VoIP adapter in the registry service as a key-value pair.

17. The method of claim 14, further comprising initiating a PSTN call over the PSTN to the first VoIP adapter prior to advertising the first VoIP adapter as reachable over VoIP.

18. The method of claim 17, further comprising the second VoIP adapter initiating a call to the first VoIP adapter over VoIP in response to the advertising by the first VoIP adapter that the first VoIP adapter is reachable over VoIP at the dial sequence.

19. The method of claim 14, further comprising removing any advertised dial sequence of the first VoIP adapter in response to a loss of power on a power line provided by the PSTN, wherein the power line is coupled to the first VoIP adapter.

20. The method of claim 14, wherein determining the dial sequence based on the at least one of the call details in the registry service includes:
the second VoIP adapter searching in the registry service for a plurality of hashed call details generated from at least two of the call details to find a plurality of associated node identifiers; and
in response to each one of the associated node identifiers matching a node identifier of the first VoIP adapter, transmitting the dial sequence to the first VoIP adapter.

* * * * *